United States Patent
Monnier et al.

(10) Patent No.: US 12,365,323 B2
(45) Date of Patent: Jul. 22, 2025

(54) HEAVY DUTY VEHICLE REDUNDANT BRAKING SYSTEM

(71) Applicant: Volvo Truck Corporation, Gothenburg (SE)

(72) Inventors: Martin Monnier, Oullins (FR); Lionel Farres, Heyrieux (FR)

(73) Assignee: Volvo Truck Corporation, Gothenburg (SE)

( * ) Notice: Subject to any disclaimer, the term of this patent is extended or adjusted under 35 U.S.C. 154(b) by 504 days.

(21) Appl. No.: 17/858,210

(22) Filed: Jul. 6, 2022

(65) Prior Publication Data

US 2023/0009033 A1     Jan. 12, 2023

(30) Foreign Application Priority Data

Jul. 6, 2021   (EP) .................................. 21183861

(51) Int. Cl.
  *B60T 13/68*  (2006.01)
  *B60T 8/92*  (2006.01)
  (Continued)

(52) U.S. Cl.
  CPC ............ *B60T 13/683* (2013.01); *B60T 8/92* (2013.01); *B60T 13/36* (2013.01); *B60T 17/22* (2013.01);
  (Continued)

(58) Field of Classification Search
  CPC .......... B60T 13/683; B60T 13/36; B60T 8/92; B60T 2270/402; B60T 2270/413;
  (Continued)

(56) References Cited

U.S. PATENT DOCUMENTS 11,180,127 B2 *   11/2021   Farres ................... B60T 15/027
2019/0337502 A1   11/2019   Farres et al.
(Continued)

FOREIGN PATENT DOCUMENTS

EP        3564082 A1    11/2019

OTHER PUBLICATIONS

Extended European Search Report for European Patent Application No. 21183861.0, mailed Dec. 21, 2021, 5 pages.
(Continued)

*Primary Examiner* — Pamela Rodriguez
(74) *Attorney, Agent, or Firm* — Withrow & Terranova, PLLC (57) ABSTRACT

An electro-pneumatic brake system for an automotive vehicle, with a service brake arrangement and a park brake arrangement, comprising front and rear axle brake modules, each of front and rear axle brake module comprising an electrical control input and a pneumatic control input, a first bistable relay valve, possibly a second bistable relay valve to supply the trailer, first and second pressure control devices for generating first and second pressure, first and second service brake backup line, for supplying the pneumatic control input of the front and rear axle brake module, a swap arrangement configured to selectively connect the first pressure to the input of the first bistable relay valve or to the first service brake backup line, and connect the second pressure to the input of the second bistable relay valve or to the second service brake backup line.

15 Claims, 5 Drawing Sheets

(51) Int. Cl.
*B60T 13/36* (2006.01)
*B60T 17/22* (2006.01)

(52) U.S. Cl.
CPC ... *B60T 2270/402* (2013.01); *B60T 2270/413* (2013.01); *B60T 2270/88* (2013.01)

(58) Field of Classification Search
CPC .... B60T 2270/88; B60T 17/22; B60T 13/662; B60T 15/20; B60T 15/203; F16D 65/14
See application file for complete search history.

(56) References Cited

U.S. PATENT DOCUMENTS

| | | |
|---|---|---|
| 2020/0047730 A1 | 2/2020 | Van Thiel |
| 2021/0078556 A1 | 3/2021 | Laine et al. |
| 2021/0122350 A1 | 4/2021 | Farres et al. |

OTHER PUBLICATIONS

Intention to Grant for European Patent Application No. 21183861.0, mailed Sep. 29, 2023, 31 pages.

\* cited by examiner

HEAVY DUTY VEHICLE REDUNDANT BRAKING SYSTEM

RELATED APPLICATIONS

The present application claims priority to European Patent Application No. 21183861.0, filed on Jul. 6, 2021, and entitled "HEAVY DUTY VEHICLE REDUNDANT BRAKING SYSTEM," which is incorporated herein by reference in its entirety.

TECHNICAL FIELD

This invention relates to an electronically controlled pneumatic brake system for an automotive vehicle, particularly a truck or the like. This invention also relates to an automotive vehicle equipped with such a system.

BACKGROUND OF THE DISCLOSURE

In the field of automotive vehicles, reliable trajectory control is among the prominent safety features required for ensuring smooth and secure traffic on roads. More particularly, steering and braking function are of utmost importance.

The present disclosure focuses more particularly on the braking function, which relies, in particular for trucks, and more generally for heavy duty vehicles, on an electro-pneumatic system using air under pressure as working fluid.

It has been made compulsory for long to provide two independent pneumatic circuits, as a redundant arrangement in order to keep a braking capability in case one circuit undergoes a failure.

Later, solutions using electric control on top of baseline pneumatic system were introduced to speed up pressure changes at axles, so the effective control at brake actuators can reflect driver controls in a more real time fashion.

More recently, a trend to go towards brake-by-wire solutions and autonomous vehicles has lead the trucks designers to simplify the foot pedal brake unit by removing all the pneumatic components from the foot pedal unit, as taught in EP3564082, and to provide a backup service brake function to ensure redundancy. However, it has been found that the backup mode is not always as effective and quick to react and take the lead as expected, compared to the normal service brake function. Also it is understood that duplicating all the service brake system is not cost-effective and it would increase the weight of the braking system, therefore such duplication should be avoided.

The present inventors have sought to find an improved solution while offering an excellent overall cost effectiveness.

SUMMARY OF THE DISCLOSURE

According to a first aspect of the present disclosure, it is disclosed an electro-pneumatic brake system for an automotive vehicle, said system comprising a service brake arrangement and a park brake arrangement, said service brake arrangement being configured to operate either under a normal brake operating mode or under a redundant operating mode, said system comprising:
one or more front axle brake module (FBM, 9F) for providing pneumatic brake pressure to the left and right front pneumatic brake actuators (FW-L, FW-R),
one or more rear axle brake module (RBM, 9R) for providing pneumatic brake pressure to the left and right rear pneumatic brake actuators (RW-L, RW-R), wherein one or more of rear pneumatic brake actuators comprising a park brake chamber,
each of front and rear axle brake module (FBM, RBM) comprising an electrical control input (E1) and a pneumatic control input (E2),
a first bistable relay valve (1) configured to supply parking brake pressure to the park brake chambers,
a second bistable relay valve (2) configured to supply trailer air pressure to the trailer,
a first pressure control device (4) for generating a first pressure (P1),
a second pressure control device (5) for generating a second pressure (P2),
a first service brake backup line (8F), for controlling at least the pneumatic control input of the front axle brake module (FBM, 9F)
a second service brake backup line (8R) for controlling the pneumatic control input of the rear axle brake module (RBM, 9R)
the system characterized in that it comprises a swap arrangement (3) configured to:
selectively connect the first pressure (P1) to the input of the first bistable relay valve (1) or to the first service brake backup line (8F),
selectively connect the second pressure (P2) to the input of the second bistable relay valve (2) or to the second service brake backup line (8R).

The above aspect applies particularly for a vehicle which is fitted with a trailer handling function, for example a tractor of semi-trailer, a carrier to which trailer(s) can be attached, etc.

Advantageously, we use common elements for park brake control, trailer control and redundant service brake. This provides overall optimization and cost effectiveness.

Thanks to this arrangement, it is possible to optimize the overall configuration of the braking system, and to share at least part of the common pneumatic circuit to control the bistable relay valves and to provide a redundant control for the service brake function.

A functional redundancy is therefore provided with few additional components in the pneumatic circuit. Furthermore, independence and redundancy goals are met, in particular for some driverless configurations, according to the autonomous drive levels. The redundant service brake function is found to be efficient and reactive, although cost-effective.

According to a second aspect of the present disclosure, it is disclosed (e.g. for trailer-less configuration) an electro-pneumatic brake system for an automotive vehicle, said system comprising a service brake arrangement and a park brake arrangement, said service brake arrangement being configured to operate either under a normal brake operating mode (NF) or under a redundant operating mode (BF), said system comprising:
one or more front axle brake module (FBM, 9F) for providing pneumatic brake pressure to the left and right front pneumatic brake actuators (FW-L, FW-R),
one or more rear axle brake module (RBM, 9R) for providing pneumatic brake pressure to the left and right rear pneumatic brake actuators (RW-L,RW-R), wherein one or more of rear pneumatic brake actuators comprising a park brake chamber, each of front and rear axle brake module (FBM, RBM) comprising an electrical control input (E1) and a pneumatic control input (E2), a first bistable relay valve (1) configured to supply parking brake pressure to the park brake chambers, a first pressure control device (4) for generating a first pressure (P1), a second pressure control device (5) for generating a second pressure (P2), a first service brake backup line (8F), for controlling at least the pneumatic control input of the front axle brake module (FBM, 9F)

a second service brake backup line (8R) for controlling the pneumatic control input of the rear axle brake module (RBM, 9R)

the system characterized in that it comprises a swap arrangement (3) configured to:

selectively connect the first pressure (P1) to the input of the first bistable relay valve (1) or to the first service brake backup line (8F), the swap arrangement (3) being further configured to connect the second pressure (P2) to the second service brake backup line (8R).

The above aspect applies particularly for vehicles deprived of a trailer handling function, for example some coaches, some types of carriers. In such configurations, there is no trailer relay valve compared to the configuration of the first aspect. Nonetheless, we use common elements for park brake control and redundant service brake. This provides overall optimization and cost effectiveness.

Starting from this second aspect, the system may further comprise a second bistable relay valve (2) configured to control pressure supplied to a trailer, the swap arrangement (3) being further configured to selectively connect the second pressure (P2) to the input of the second bistable relay valve (2) or to the second service brake backup line (8R). Thereby we find again the first aspect described above (Park brake+trailer functions).

In various embodiments of the invention, one may possibly have recourse in addition to one and/or other of the following arrangements, taken alone or in combination.

According to one aspect, it should be noted that there is no additional relay valve dedicated to the redundant service brake function. The usual relay valves, for parking brake, and where applicable for the trailer, remain unchanged. In particular, the outputs of these relay valves are directed conventionally to the park brake chambers and respectively where applicable the trailer control module.

According to one aspect, the swap arrangement (3) comprises a first electro-valve (31) configured to direct the first pressure (P1) either to the input of the first bistable relay valve (1) or to the first Service Brake backup line (8F).

According to one aspect, the swap arrangement (3) may comprise a second electro-valve (32) configured to direct the second pressure (P2) either to the input of the second bistable relay valve (2) or to the second Service Brake backup line (8R).

We thereby provide independent control of first service brake backup line and second service brake backup line. This can somehow improve redundancy.

According to one aspect, the first electro-valve (31) and/or a second electrovalve (32) is a 4 ports-2 positions type (4/2 valve, with four ports and two plunger positions), with an electric control.

It brings use of reliable and cost-effective components.

According to one aspect, the swap arrangement (3) may comprise a single combined 6/2 distributor i.e. 6 ports—2 positions type, or 7 ports—2 positions type.

We use of a single component for the swapping function; it is space saving.

According to one aspect, the single combined 6/2 distributor is pneumatically controlled from a third electro-valve (33).→Reliable and cost-effective control of the combined swapping distributor. Also this means only one supplemental electro-valve to be controlled by the air module production (APM) control unit According to one aspect, the swap arrangement is spring loaded/biased to a rest state so that when non energized in the rest state, the swap arrangement directs the first pressure (P1) to the first Service Brake backup line (8F), and the valve arrangement directs the second pressure (P2) to the second Service Brake backup line (8R).

By default the redundant service brake is ready to work; there is no latency time due to mode commutation.

According to one aspect, each of the first pressure control device (4) and/or the second pressure control device (5) comprises an input valve (44;54), an output valve (45;55) and a pressure sensor (S1;S2) for establishing respectively a first pressure and a second pressure according to electronically defined real-time pressure setpoints, and performing a closed loop control. A closed loop feedback and control is thereby provided for P1 & P2 generation.

According to one aspect, each of the input valve (44) and output valve (45) are normally closed ON/OFF valves. These are cost-effective and well mastered components.

According to one aspect, the system may further comprise pressure sensors (S3, S4) respectively on the first and second Service Brake backup lines. This allows checking proper operation of the swap arrangement and troubleshooting of the swap arrangement.

According to one aspect, the first Service Brake backup line (8F) also controls the trailer brake control module. Since it is advantageous to brake first the front axle and then rear axle of the truck, the trailer is also braked a little before the rear axle, thereby in practice the trailer does not push the rear of the truck; this improves vehicle handling and braking and this enhances safety.

It is not excluded though that alternatively the trailer brake control module is controlled together with the second Service Brake backup line (8R).

According to one aspect, the system comprises an air production module (6), and the air production module (6) houses at least the following components:

the first bistable relay valve (1) and where applicable the second bistable relay valve (2), the swap arrangement (3), whatever the possible variants, the first pressure control device (4) and the second pressure control device (5), wherein control is carried out by an air production module control unit (8) housed in the air production module.

According to one aspect, the air production module control unit (8) operates independently from a control unit (7) of the baseline service brake.

Besides, the present disclosure is also directed to a vehicle comprising a system as described above. This vehicle can be typically a truck, without excluding a bus, a coach. The truck can be a tractor or a carrier truck.

According to another viewpoint, the present disclosure is also directed to a method to control a brake system comprising a service brake arrangement and a park brake arrangement, said service brake arrangement being configured to operate either under a normal brake operating mode or under a redundant operating mode, said service brake arrangement comprising:

one or more front axle brake module (FBM, 9F) for providing pneumatic brake pressure to the left and right front pneumatic brake actuators (FW-L, FW-R), one or more rear axle brake module (RBM, 9R) for providing pneumatic brake pressure to the left and right rear pneumatic brake actuators (RW-L, RW-R), wherein one or more of rear pneumatic brake actuators comprising a park brake chamber, each of front and rear axle brake module (FBM, RBM) comprising an electrical control input (E1) and a pneumatic control input (E2), a first bistable relay valve (1) configured to supply parking brake pressure to the park brake chambers, a first service brake backup line (8F), for controlling at least the pneumatic control input of the front axle brake module (FBM, 9F)

a second service brake backup line (8R) for controlling the pneumatic control input of the rear axle brake module (RBM, 9R), a swap arrangement (3), the method comprising:

a1—generate a first pressure (P1) from a first pressure control device (4), a2—generate a second pressure (P2) from a second pressure control device (5), b0—when no change is required on the parking brake, cause the swap arrangement to connect/couple the first pressure (P1) to the first service brake backup line (8F), and to connect/couple the second pressure (P2) to the second service brake backup line (8R), b1—when a change is required on the parking brake, cause the swap arrangement to connect/couple the first pressure (P1) to the input of the first bistable relay valve (1), and control the first pressure (P1) on purpose, until a desired change of state is achieved.

According to one aspect, the system may further comprise a second bistable relay valve (2) configured to supply trailer air pressure to a trailer, wherein the method comprises:

b2—when a change is required on the trailer air supply, cause the swap arrangement to connect/couple the second pressure (P2) to the input of the second bistable relay valve (2), and control the second pressure (P2) on purpose, until a desired change of state is achieved.

According to one aspect, steps b1 and b2 can be carried out simultaneously by use of a single combined 6/2 distributor (34).

According to one aspect, wherein the swap arrangement is spring loaded/biased to a rest state, and wherein steps b1 and b2 require energizing to be carried out, otherwise step b0 prevails.

According to one aspect, it is contemplated that wherein the swap arrangement is energized, first pressure control device (4) and second pressure control device (5) are readjusted to cause a desired action on the bistable relay valve (1) and respectively where applicable a desired action on the second bistable relay valve (2).

According to one aspect, it is contemplated that wherein the swap arrangement is no longer energized back to rest state, first pressure control device (4) and second pressure control device (5) are readjusted to generate service brake pressure according to a current pointset.

According to one aspect, it is considered that when the park brake is fully set and the vehicle is in a stable condition, redundant service brake operating mode is no longer necessary and therefore steps a1 and a2 can become unnecessary. In practice when the park brake is fully set in the vehicle is in stable condition outputs of the first and second first pressure control device (4,5) are set to zero. Stated otherwise, first pressure and second pressure (P1,P2) are purged when there is no need to prepare a redundant service brake operation.

BRIEF DESCRIPTION OF THE DRAWINGS

Other features and advantages of the invention appear from the following detailed description of two of its embodiments, given by way of non-limiting example, and with reference to the accompanying drawings, in which.

DETAILED DESCRIPTION OF THE DISCLOSURE

In the figures, the same references denote identical or similar elements. Unless stated otherwise, the pneumatic lines are shown thicker than the electrical lines. Besides, pneumatic supply lines are shown thicker than pneumatic control lines.

Figure 1:
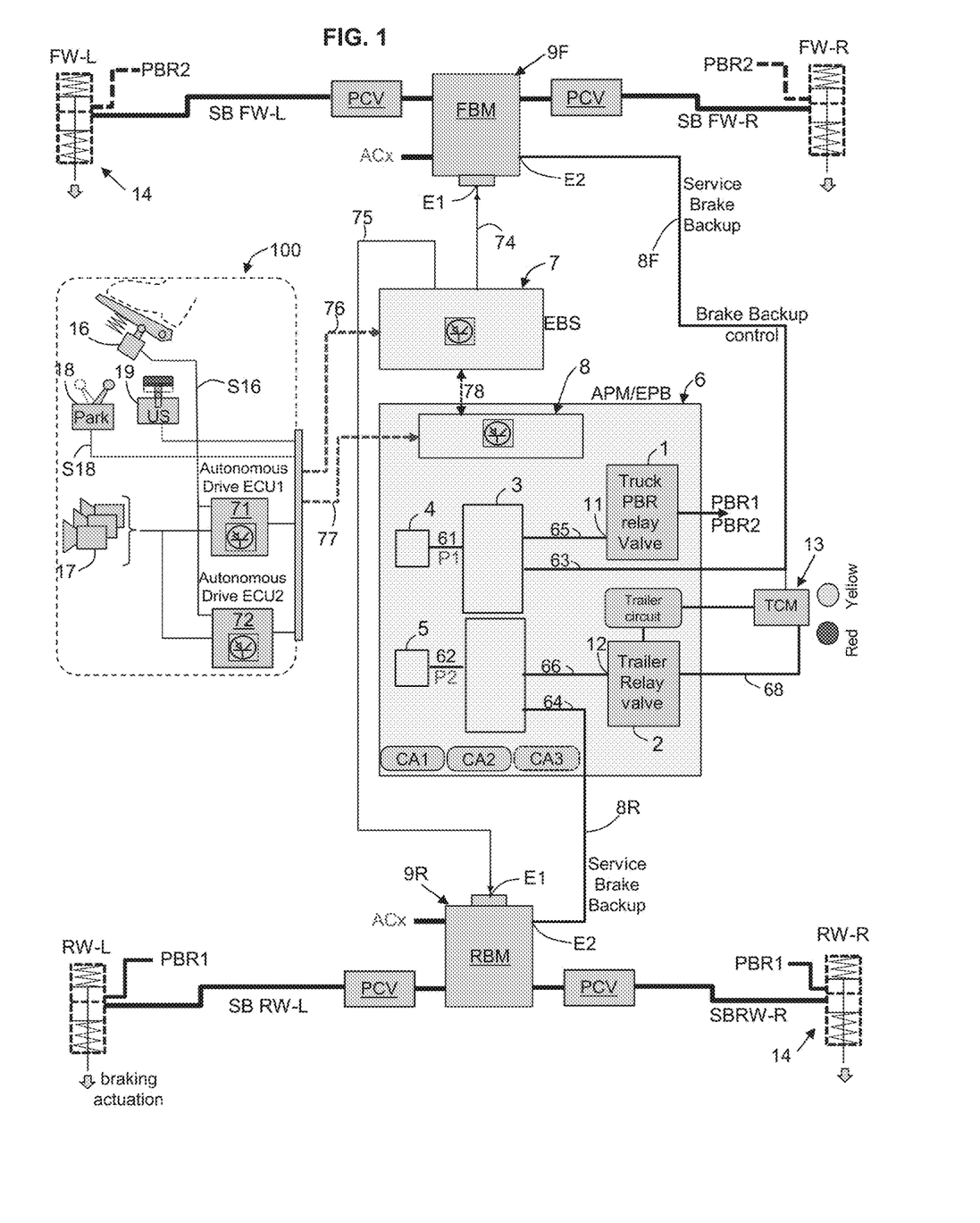
FIG. 1 illustrates a diagrammatical circuit layout of an electro-pneumatic braking system for a truck according to the invention.

FIG. 1 shows a diagrammatical circuit layout of an electro-pneumatic braking system for a truck. The proposed configuration is also valid for any kind of heavy-duty vehicles including buses and coaches.

The truck considered here can be the traction unit in a tractor/trailer configuration or a utility 'carrier' truck.

Overview of the Braking System

For the sake of clarity we have represented the same brake actuator for all the wheels, but of course, there may be variations and difference according to the location of the wheel (front, rear, trailer etc. . . . ).

The electro-pneumatic brake system comprises a service brake arrangement and a park brake arrangement. The service brake arrangement is configured to operate either under a normal brake operating mode NF or under a redundant operating mode BF in case the normal brake operating mode becomes unavailable for any reason.

As known per se, all truck brakes actuators (RW-L, RW-R, FW-L, FW-R) can be combined service brake and park brake actuators. For more detailed explanation of the brake actuators, generically denoted 14, the reader might refer to FIG. 7 of EP3564082 and the relative comments therein.

There may be provided more than 4 brake actuators 14, in case there are two front axles, and/or two or more rear axles. The number of brake actuators can amount to 2,4,6,8, or more. It is worth noting that some brake actuators can be deprived of the parking brake function. The number of brake actuators can be twice the number of axles.

Further, trailer brake actuators can be similar to truck brake actuators.

Service Brake

In the illustrated example, each axle or group of axles is equipped with a brake module, e.g. in the illustrated example a front axle brake module FBM (also denoted 9F) and one (or more) rear axle brake module RBM (also denoted 9R).

However, in other configurations (not shown), there may be provided one such brake module per wheel or one such brake module per twin wheels.

The front axle brake module FBM provides pneumatic brake pressure to the left and right front pneumatic brake actuators (FW-L, FW-R). The rear axle brake module RBM provides pneumatic brake pressure to the left and right rear pneumatic brake actuators (RW-L, RW-R).

Figure 7:
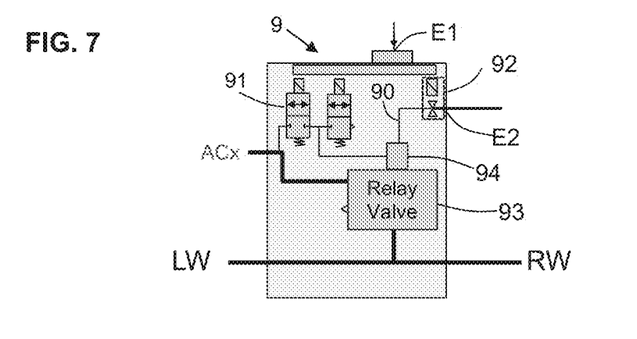
FIG. 7 illustrates schematically some key components comprised in a front (or rear) brake module of the single-channel type.
Figure 8:
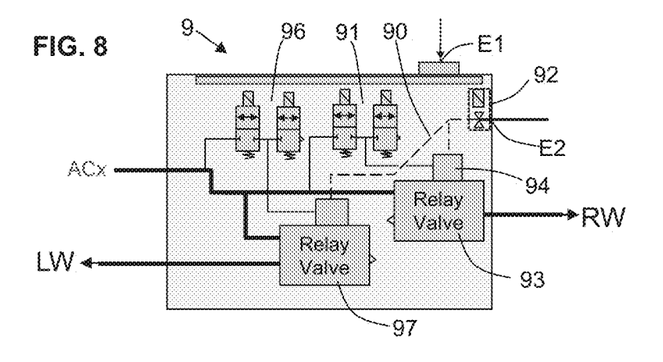
FIG. 8 illustrates schematically some key components comprised in a front (or rear) brake module of a double-channel type

Each of the front and rear axle brake modules (FBM, RBM) is an electro-pneumatic device providing a pneumatic relay function. In short, as illustrated at FIG. 7 and FIG. 8, it selectively takes air from the compressed air supply ACx and selectively releases air to the atmosphere while following faithfully the control signals (electrical and/or pneumatic); its output is connected to the service brake chamber of the corresponding brake actuator (through a PCV valve or directly).

Each of front and rear axle brake module (FBM, RBM) is controlled either via an electrical control input E1 or via a pneumatic control input E2 as will be explained below.

Downstream the front and rear brake modules, there are provided anti-lock valves PCV which will be discussed more in details later. However anti-lock valves can also be integrated in the rear axle brake modules (FBM, RBM).

Normal Brake Mode

The front and rear brake modules are electrically controlled from a central braking control unit 'EBS' denoted 7. This control unit 7 calculates braking setpoints and outputs electrical control signals reflecting the braking setpoints respectively to the front brake module and the rear brake module. There may be strategies to balance braking pressure between the front axle and the rear axle, presence and payload of a trailer can also be taken into account. Also the timing strategy can differ between front and rear axles. Braking intensity and timing are worked out timely by the central braking control unit 7.

Conventionally, the brake system comprises a service brake electric input device 16 (formed generally as a brake foot pedal) delivering a first input electric signal S16. It should be appreciated that the brake foot pedal is optional in the perspective of the present invention which can be applied to fully autonomous vehicles. Further the brake system comprises a park brake control device 18 (formed generally as handle, or the push-pull button 19 in the US version).

In the context of partly or fully autonomous vehicles, as depicted in FIG. 1, VMM function block 100 designates high level control and medium level control of the vehicle trajectory. The acronym "VMM" stands for Vehicle Motion Management.

VMM function block 100 comprises one or more control units (71,72) adapted to process various inputs, in particular a first input electric signal S16 delivered by the foot brake pedal 16 but also the park brake control signal S18 delivered by a park brake actuator 18 (19 denoting the US variant).

VMM function block 100 delivers various electrical control signals 76 to the central braking control unit 7.

In turn, as already mentioned, the central braking control unit 7 delivers one or more electrical control signals (74,75) to the front and rear axle brake modules FBM, RBM.

According to one example, electrical control signals delivered by VMM function block 100 which can be messages denoted 76, are sent to the central braking control unit 7. Further, electrical control signals delivered by VMM function block 100 which can be messages denoted 77, are sent to another control unit denoted 8 that will be discussed later.

Autonomous drive control units 71,72, act as redundant units which work either in a parallel mode or in a master/slave mode.

First and second autonomous drive control units 71,72, rely on one or more cameras 17 which provides a flow of images which are analyzed in autonomous drive control units 71,72. There may be provided other type of sensors like radars, lidars, or the like inertial sensors. Also communication data received wirelessly from various traffic aware entities (from fixed or mobile entities). Generally speaking, VMM function block 100 exhibits means for having accurate and real-time environmental awareness. This situation awareness allows VMM function block 100 to take decisions about steering and braking.

Each of the front and rear axle brake modules (FBM, RBM) is controlled by the above mentioned electrical control signals (74,75) under a normal mode called "normal brake operating mode" NF, although there is provided a redundant way to control service brake that is discussed below.

Backup Service Brake Mode—Redundant Service Brake

Whenever the normal mode is not fully operative, in particular from an electrical problem, disruption/lack of electrical supply at the central electronic brake control unit 7, from the viewpoint of at least one of to the front and rear axle brake modules FBM, RBM, there is provided in the system an alternative mode called backup brake operating mode BF.

Advantageously, each of the front and rear axle brake modules (FBM, RBM) can be controlled by a pneumatic backup brake control line 63,64 under the backup brake operating mode. In this case, the electro-valve denoted 92 (see later) is in opened state instead of closed state in the normal operating mode.

There are provided a first service brake backup line 8F, for controlling at least the pneumatic control input of the front axle brake module (FBM, 9F) and a second service brake backup line 8R for controlling the pneumatic control input of the rear axle brake module (RBM, 9R). The first service brake backup line 8F and the second service brake backup line 8R are pneumatic lines.

The first service brake backup line 8F is coupled to the output line 63 controlled independently from the central service brake unit 7. The second service brake backup line 8R is coupled to the output line 64 controlled independently from the central service brake unit 7.

Air Supply

There are provided a first air supply circuit AC1 and a second air supply circuit AC2. As known per se, there is provided a compressor, a first air reservoir coupled to the first air supply circuit AC1 and a second air reservoir coupled to the second air supply circuit AC2. The two air reservoirs are independent from one another. Also the first and second air supply circuits (AC1, AC2), are independent from one another.

First and second air supply circuits have a service pressure set around 12 bars. In practice, first and second air supply circuits AC1, AC2, may have a service pressure comprised in the range [5 bars-15 bars], preferably comprised in the range [7 bars-12 bars].

The first air supply circuit AC1 provides air under pressure to the rear axle brake module RBM. The second air supply circuit AC2 provides air under pressure to the front axle brake module FBM. AC1 is sometimes called 'primary' circuit, AC2 is sometimes called 'secondary' circuit, since rear brakes are usually more powerful than front brakes.

There may be provided a third reservoir and a third air supply circuit AC3 to enhance overall air redundancy.

The air supply circuits are genetically denoted ACx in the present application.

In the drawings, ACx is represented, irrespective of the value of x. Said otherwise, the compressed air distribution from the various reservoirs may be any possible configurations and circuit layouts with more or less redundancy levels.

APM Relay Valves

Figure 6:
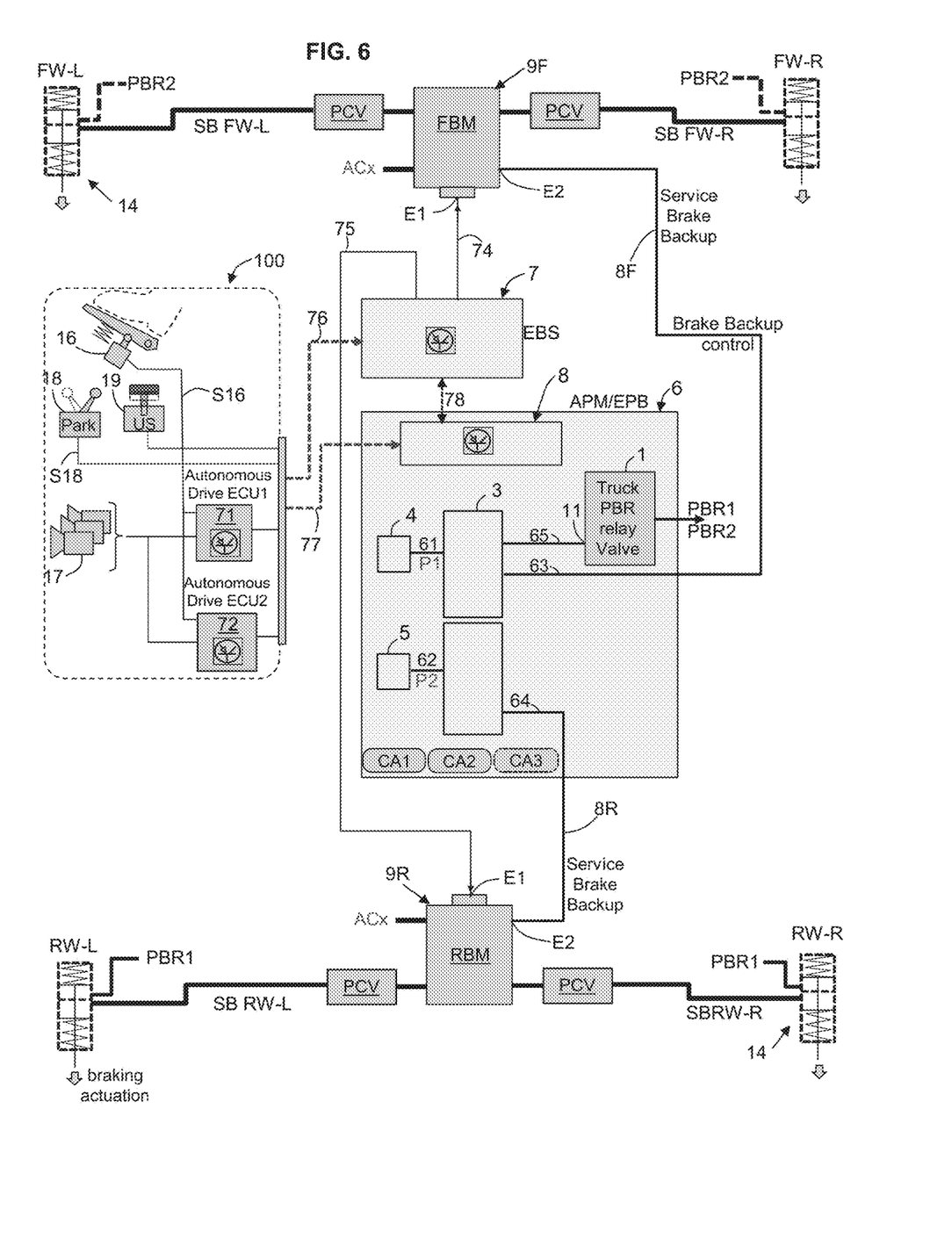
FIG. 6 is analogous to FIG. 1 and shows a third embodiment exhibiting a simplified configuration with no trailer relay valve.

The electro-pneumatic brake system comprises a first bistable relay valve 1 configured to supply parking brake pressure to the park brake chambers of the brake actuator(s) 14. The first bistable relay valve 1 is controlled through an input port 11. The output of the first bistable relay valve are denoted PBR1 and PBR2, and are pneumatically coupled to the park brake chambers of the brake actuators (FIGS. 1,6)

The electro-pneumatic brake system may comprise a second bistable relay valve 2 configured to supply trailer air pressure to the trailer. The second bistable relay valve 2 is controlled through an input port 12. The output of the second bistable relay valve is denoted 68, and is pneumatically coupled to the trailer control module (TCM, 13) of FIGS. 1 to 5.

There are some configurations where the second bistable relay valve 2 is not present.

Note that the first bistable relay valve 1 is independent from the second bistable relay valve 2.

Each of the relay valves 1,2 exhibits a back end loop circuit 21, 22 provided with a restriction 28. Stated otherwise, for each relay valve, the output of the relay valve is looped back to the respective input 11,12. This ensures stability of the pneumatic control and discards some inadvertent transients. In the present context, the above feature provides bistability to the relay valves. Thereby, only a 'positive' control (via P1 or P2) of the relay valve input can lead to a change of state of the relay valve.

Pressure Control Devices

The system comprises a first pressure control device 4 for generating a first pressure denoted P1. The system comprises a second pressure control device 5 for generating a second pressure denoted P2. Use of P1 and P2 will be discussed later.

The first pressure control device 4 comprises an input valve 44 and an output valve 45 and a pressure sensor S1 for establishing/setting the first pressure P1. Pressure P1 is established according to electronically defined real-time pressure setpoint. A closed loop real-time control is achieved.

Each of the input valve 44 and output valve 45 are normally closed ON/OFF valves. Energizing input valve 44 while maintaining output valve 45 at rest increases pressure P1, and conversely energizing output valve 45 while maintaining input valve 45 at rest decreases pressure P2.

Similarly, the first second control device 5 comprises an input valve 54 and an output valve 55 and a second pressure sensor S2 for establishing/setting the second pressure P2. Pressure P2 is established according to electronically defined real-time pressure setpoint. A closed loop real-time control is achieved. Energizing input valve 54 while maintaining output valve 55 at rest increases pressure P2, and conversely energizing output valve 55 while maintaining input valve 55 at rest decreases pressure P2.

Each of the input valve 54 and output valve 55 are normally closed ON/OFF valves.

Further, the system comprises a swap arrangement 3.

Swap Arrangement

It should be understood that instead of 'swap', we could use 'switch' or 'switchover'.

The swap arrangement 3 configured to:
selectively connect the first pressure P1 to the input 11 of the first bistable relay valve 1 or to the first service brake backup line 8F,
selectively connect the second pressure P2 to the input 12 of the second bistable relay valve 2 or to the second service brake backup line 8R.

The swap arrangement is spring loaded/biased to a rest state so that when non energized in the rest state, the swap arrangement directs the first pressure P1 to the first Service Brake backup line 8F, and the valve arrangement directs the second pressure P2 to the second Service Brake backup line 8R.

There are at least 2 different embodiments regarding the swap arrangement.

Figure 2:
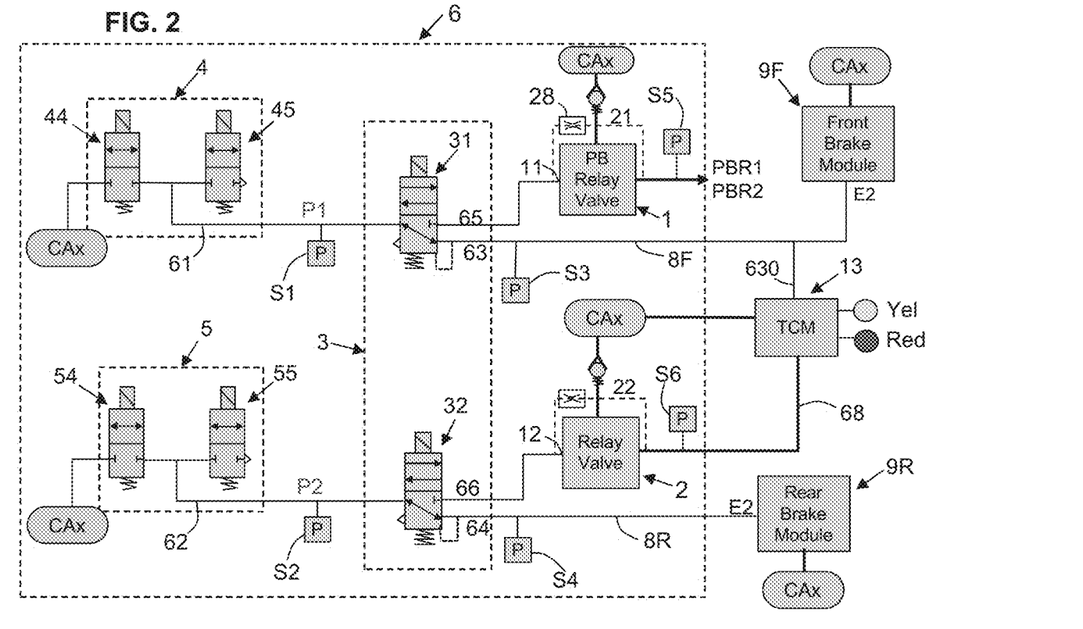
FIG. 2 shows a more detailed view of a particular portion of the electro-pneumatic brake system, according to a first embodiment, with the swap arrangement in a rest state.
Figure 3:
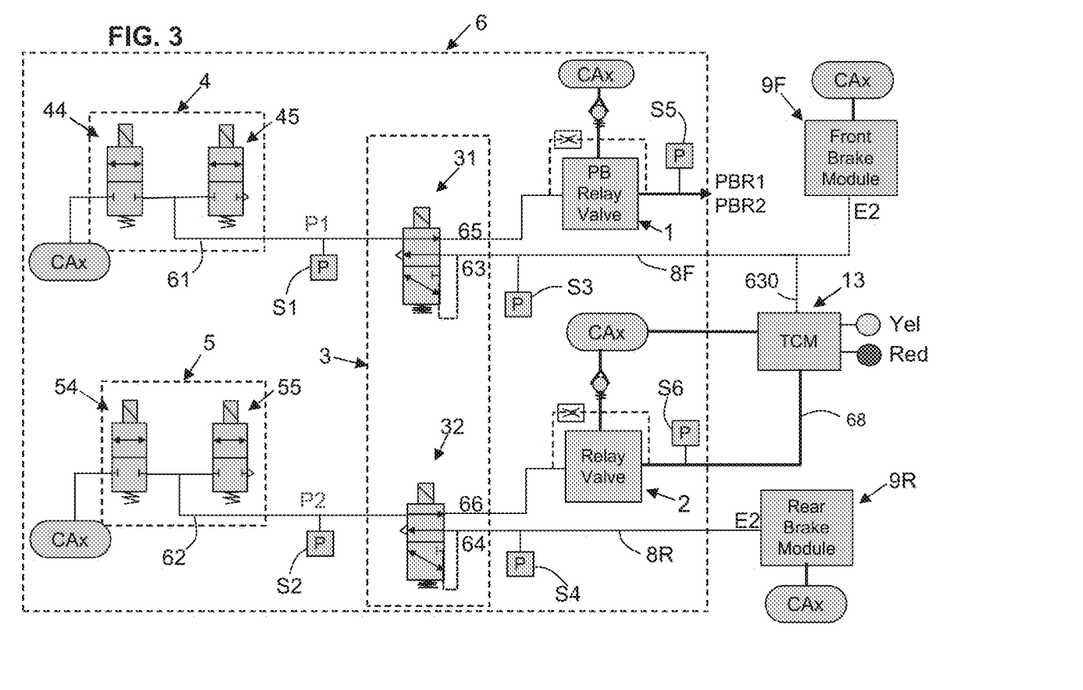
FIG. 3 is analogous to FIG. 2 and shows a more detailed view of a particular portion of the electro-pneumatic brake system, with the swap arrangement in an activated state.

According to a first embodiment, illustrated at FIGS. 2 and 3, the swap arrangement comprises a first electro-valve 31. When trailer function is present, the swap arrangement comprises a second electro-valve 32, that may be controlled independently from the first electro-valve 31.

The first electro-valve 31 and/or is a 4 ports—2 positions type (4/2 valve, with four ports and two plunger positions), with an electric control.

When trailer function is present, the second electro-valve 32 is a 4 ports—2 positions type (4/2 valve, with four ports and two plunger positions), with an electric control.

The input port of the first electro-valve 31 receives pressure P1 through line denoted 61. There are 2 outputs ports coupled respectively to lines 63 and 65. When the electro-valve is at rest state, input 61 is directed to line 63 and line 65 blocked whereas, by contrast, when the electro-valve is energized (electrically activated) input 61 is directed to line 65 and line 63 is vented.

The input port of the second electro-valve 32 receives pressure P2 through line denoted 62. There are 2 outputs ports coupled respectively to lines 64 and 66. When the electro-valve is at rest state, input 62 is directed to line 64 and line 66 is blocked whereas, by contrast, when the electro-valve is energized (electrically activated) input 62 is directed to line 66 and line 64 is vented.

The system may further comprise a pressure sensor S3 on the first service brake backup lines 8F. Optionally also pressure sensor S4 is provided on the second Service Brake backup lines 8R.

This allows checking proper operation of the swap arrangement and troubleshooting of the swap arrangement. For example in practice, the pressure prevailing at S3 should be substantially equal to the pressure prevailing at S1 when the swap arrangement is at rest state. Conversely the pressure prevailing at S3 should be substantially null when the swap arrangement is energized since line 63 is vented.

In a similar way the pressure prevailing at S4 should be substantially equal to the pressure prevailing at S2 when the swap arrangement is at rest state. Conversely the pressure prevailing at S4 should be substantially null when the swap arrangement is energized since line 64 is vented.

The system may further comprise pressure sensors (S5, S6) respectively on the output of the first relay valve first 1 and on the output of the second relay valve 2. These pressure sensors S5, S6 allow to check the state and proper operation of the relay valve.

Second Embodiment with Combined Distributor

Figure 4:
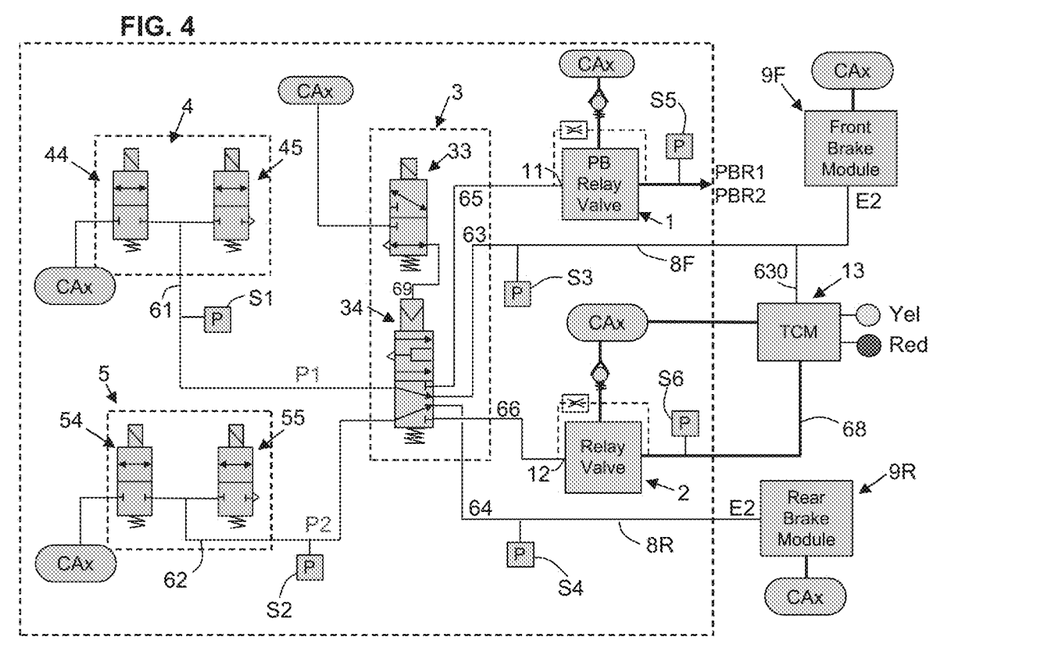
FIG. 4 shows a more detailed view of a particular portion of the electro-pneumatic brake system, according to a second embodiment, with the swap arrangement in a rest state.
Figure 5:
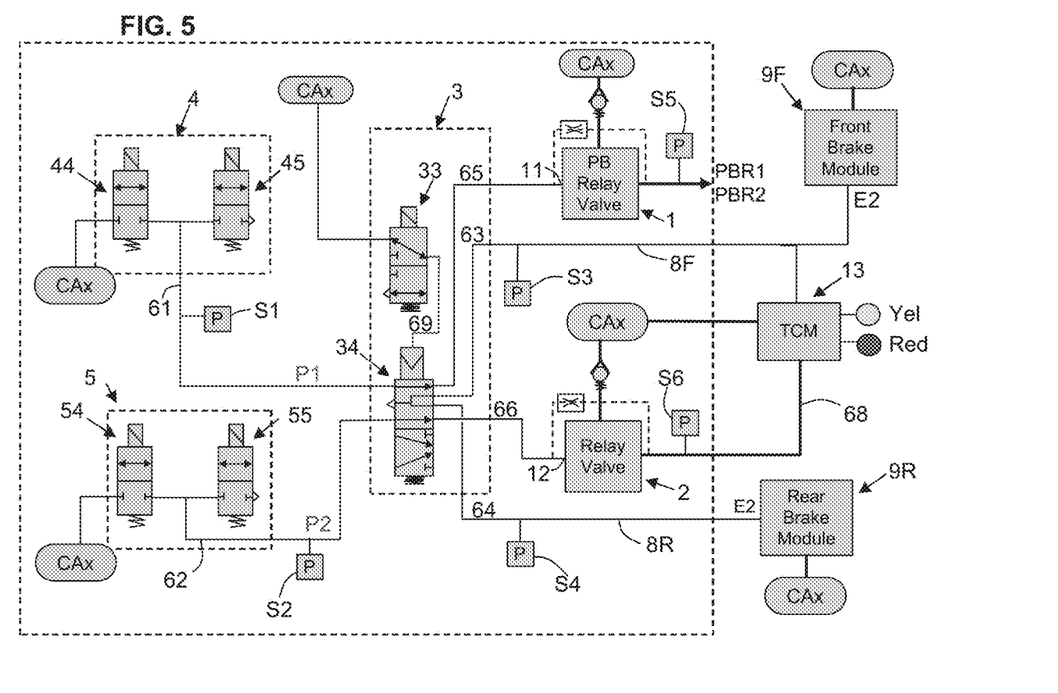
FIG. 5 is analogous to FIG. 4 and shows a more detailed view of a particular portion of the electro-pneumatic brake system, with the swap arrangement in ab activated state.

In the second embodiment of the swap arrangement, as illustrated at FIGS. 4 and 5, the swap arrangement 3 may comprise a single combined 6/2 distributor denoted 34. In practice, this distributor can be a 6 ports—2 positions type or a 7 ports—2 positions type.

The function of this distributor is similar to a combination of electro-valves 31 32 of the first embodiment working simultaneously.

There are provided two input ports at the distributor, these 2 input ports, respectively connected to lines 61, 62 already mentioned, respectively generated from first pressure control device 4 and the second pressure control device 5.

There are provided for output ports respectively connected to lines 63, 64, 65 and 66.

The single combined 6/2 distributor is pneumatically controlled from an electro-valve named here third electro-valve 33.

In the distributor there is provided a movable plunger, movable between 2 positions and biased to a rest position via spring-loaded arrangement.

The pneumatic control line 69 connects the output of third electro-valve 33 to the plunger control of the distributor 34.

When the electro-valve 33 is energized (electrically activated), line 69 is pressurized and the plunger moves away from the rest position. By contrast when the electro-valve 33 is not energized, line 69 is vented and no longer pressurized, and the plunger moves back to the rest position.

When the distributor is at rest state, input 61 is directed to line 63 and line 65 is blocked whereas, by contrast, when the distributor is energized (pneumatically activated) input 61 is directed to line 65 and line 63 is vented.

When the distributor is at rest state, input 62 is directed to line 64 and line 66 is blocked whereas, by contrast, when the distributor is energized (pneumatically activated) input 62 is directed to line 66 and line 64 is vented.

Air Production Module

The system comprises an air production module 6. The air production module is formed as a protective box.

The air production module houses at least the following components:
the first bistable relay valve 1 and where applicable the second bistable relay valve 2,
the swap arrangement 3, whatever the possible variants and embodiments,
the first pressure control device 4 and the second pressure control device 5.

The air production module houses an air production module control unit 8 (APM ECU in short). The APM ECU controls the first pressure control device 4 and the second pressure control device 5. In practice, the APM ECU 8 controls the input valve 44 and output valve 45 of the first pressure control device 4. The APM ECU 8 controls the input valve 54 and output valve 55 of the second pressure control device 5.

Further, in the first embodiment the APM ECU 8 controls the first electro-valve 31. Also, the APM ECU 8 controls the second electro-valve 32.

In the second embodiment the APM ECU 8 controls the third electro-valve 33.

Figure 9:
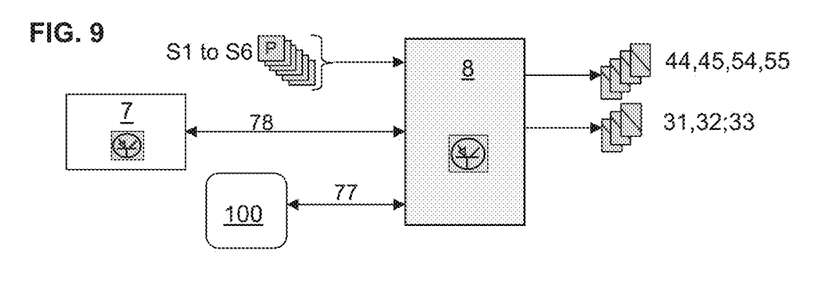
FIG. 9 illustrates schematically a functional block diagram focus on the APM ECU.

As illustrated at FIG. 9, the APM ECU 8 receives pressure values delivered by pressure sensors S1 to S6.

The APM ECU 8 receives electrical control signals and/or data messages from VMM function block 100 (data flow 77). The APM ECU 8 exchanges data with central brake control unit 7 through data line denoted 78.

Note that, although they exchange data, the APM control unit 8 operates independently from the control unit 7 of the baseline service brake.

Method and Functional Behavior

When no change is required on the parking brake, the swap arrangement connect/couple the first pressure P1 to the first service brake backup line 8F, illustrated in FIG. 2 and FIG. 4. The swap arrangement connect/couple the second pressure P2 to the second service brake backup line 8R. Under this condition the redundant operating mode is ready, P1 and P2 follow the setpoints of the electrical control signals.

However, as long as the electrical control is valid and available, the selection electro-valve 92 remains closed, the control via the electrical signals prevails.

When something goes wrong either at the central braking control unit 7 or in the electrical power supply or in the CAN bus, a redundant mode takes over in the following manner. Under such circumstance, front and/or rear axle brake module FBM, RBM control the isolation valve 92 to the open state to let the pneumatic control line 8F 8R reach the relay valve inside the brake module. Since pressure P1 and P2 was already established as setpoint values, the takeover is made instantly with no delay.

When a change is required on the parking brake, the swap arrangement connect/couple the first pressure P1 to the input of the first bistable relay valve 1 until a desired change of state is achieved. For example, when the parking brake need to be applied, the swap arrangement is activated and the first pressure P1 is set to 0 thereby purging the parking brake chamber through the park brake relay valve 1. When the parking brakes need to be released, the swap arrangement is activated and the first pressure P1 is set to service pressure thereby pressurizing the parking brake chambers through the park brake relay valve 1.

When a change is required on the trailer air supply, the swap arrangement connect/couple the first pressure P2 to the input of the second bistable relay valve 2 until a desired change of state is achieved.

For example, when the trailer needs to be supplied, the swap arrangement is activated and the second pressure P2 is set to service pressure thereby pressurizing the trailer supply line through the trailer brake relay valve 2. When the trailer needs to be purged, the swap arrangement is activated and the second pressure P2 is set to 0 thereby purging the trailer supply line through the trailer brake relay valve 2.

Figure 10:
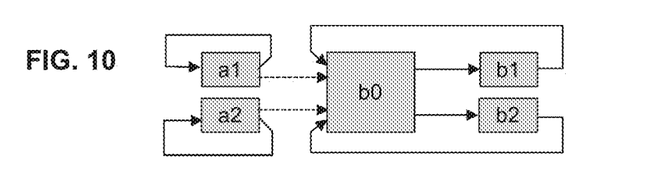
FIG. 10 shows an exemplary logic diagram illustrating the promoted method.

As illustrated at FIG. 10, steps a1 and a2 denote respectively the step of generating a control pressure P1 and P2. This control is carried out iteratively in real-time and also depending on the function required either redundant service brake or change of state of park brake or change of state of trailer supply.

Step b0 denotes the default state swap arrangement where P1 and P2 are directed respectively to the front and rear service brake backup lines.

Step b1 denotes a process to change or confirm state regarding the park brake relay valve 1.

Step b2 denotes a process to change or confirm state regarding the trailer supply relay valve 1.

We note here that the park brake change is usually required only when the vehicle is at null speed at standstill. As soon as the vehicle moves, first and second pressure control device are allocated the redundant service brake function, without need to be used for parking brake or trailer.

Thus, time sharing is optimal regarding use of first and second pressure control devices 4,5.

ABS Function

There are provided wheel speed sensors, at least one per braked wheel. As known per se individual with speeds is processed by the control unit to determine whether there is a wheel that starts locking or at least with a decreasing speed.

Each of the front and rear axle brake modules FBM, RBM can be either in one integrated unit or in 3 physical units, with the PCV (pressure control valve) separated from the pneumatic relay function, as illustrated.

The PCV (pressure control valve) performs anti-locking function (ABS function). PCV has a first valve in a series arrangement that can block the passage or air down to the brake chamber, and a second valve that can take out air from the brake chamber circuit and release it to the atmosphere. These valves are controlled in accordance with the real time analysis of the speed of each wheel. These valves can be controlled by the central braking unit 7 and/or in a redundant manner by the APM ECU 8.

More precisely, it is contemplated that, in the normal mode of the service brake, the PCV valves are controlled by the central braking control unit 7, and the PCV valves are controlled in the service brake redundant/backup mode by the APM ECU 8. Consequently, whenever the redundant/backup mode takes over the normal mode, braking performances are maintained at the expected level such that there is no downgrading of braking performance.

Regulation can occur as soon as one of the monitored wheel exhibits a decreasing speed, compared to the other wheels.

As shown in FIGS. 1 and 6, the PCV (pressure control valve) are separated from the FBM which performs mainly a relay function (electrical+pneumatic control for this relay function). The pressure control valves can be integrated in the FBM and RBM respectively. Of course, a mixed configuration is possible.

Front and Rear Axle Brake Modules (FBM, RBM)

As illustrated at FIG. 7, in a single-channel configuration of axle control module 9, the pneumatic control input E2 arrives in an isolation electro-valve 92. The local control unit controls the pressure control device 91 that controls the relay valve 93 in the normal operating mode. The local control unit receives setpoints at electrical control input E1. An internal pneumatic line 90 coming from the isolation valve and going to the relay valve is inactive as long as the isolation valve is closed. When the backup mode is triggered, the isolation valve 92 becomes open and the internal pneumatic line 90 conveys pressure P1 (or P2 respectively) to the relay valve.

A single pneumatic power output is directed to left and right wheel.

As illustrated at FIG. 8, in a double-channel configuration of axle control module 9, there are provided two pressure control device 91, 96 and two relay valves 93, 97. In a similar manner as above, the internal pneumatic line 90 coming from the isolation valve and going to the relay valves is inactive as long as the isolation valve is closed. When the backup mode is triggered, the isolation valve 92 becomes open and the internal pneumatic line 90 conveys pressure P1 (or P2 respectively) to the relay valves 93,97.

Under electrical control (normal mode) relay valves 93, 97 are independently controlled and do not deliver necessarily the same pressure output.

A dedicated pneumatic power output is directed to left wheel and a dedicated pneumatic power output is directed to the right wheel. Differentiated left/right braking can participate in one or more trajectory control functions.

Miscellaneous

As illustrated at FIG. 6, the invention also concerns a variant version without trailer function. In such case, there is no trailer relay valve, and the second pressure control device is directly connected to line 64.

It should be noted that, according to the first embodiment and according to the second embodiment, it is possible to change the state of the trailer relay valve without changing the state of the park brake relay valve, for example for purpose of the so-called trailer test process.

Conversely, it is also possible to change the state of the park brake relay valve without changing the state of the trailer relay valve.

Even though a distributor is used as in the second embodiment, separate and specific control of pressures P1 and P2 allows to control individually on the one hand the park brake relay valve and on the other hand the trailer relay valve. P1 can be controlled to high pressure, meanwhile P2 is controlled to 0. The contrary is also possible of course.

It should be noted that when the park brake is fully set and the vehicle is in a stable condition (null speed), redundant service brake operating mode is no longer necessary and therefore steps a1 and a2 can become unnecessary. In practice when the park brake is fully set and the vehicle is in stable condition, outputs of the first and second first pressure control device (4,5) are set to zero. Stated otherwise, first pressure and second pressure (P1,P2) are purged when there is no need to prepare a redundant service brake operation. By contrast, preparing for redundant service brake operation can be started as soon as engine is on and/or park brake is to be released.

It should be noted that there is no additional relay valve dedicated to the redundant service brake function. The usual relay valve 1, for parking brake, and the relay valve 2 for the trailer, remain unchanged.

In particular, the outputs of these relay valves are directed conventionally to the park brake chambers and respectively where applicable the trailer control module.

When trailer function is present, there is provided a trailer control module 13, to which are coupled the glad-hands that forms the interface to the trailer.

It should be noted that the proposed configuration is a suitable for European regulation, USA regulation, for Australia regulation. Only the trailer control module 13 may support variations according to regulations.

As illustrated, the trailer control module 13 is controlled via line 630 which is a derivation of line 63,8F. Said otherwise the first Service Brake backup line 8F) also controls the trailer brake control module.

Data lines 74, 75, 76, 77, 78 may be embodied in any form. In one example of interest, data lines 76, 77, 78 are supported by a CAN bus architecture. Data lines 74,75 can be supported by a private bus or a CAN bus.

It shall be noted that time required to change a relay valve state (park brake or trailer) is less than 10 seconds, preferably less than 5 seconds, more preferably less than 3 seconds. The swap arrangement needs to be energized at least during this process, but not much more; thereby electrical consumption of the swap arrangement is very low. We note that except for controlling the relay valves 1,2 the consumption of the swap arrangement is null.

Also it should be noticed that the promoted configuration only needs to add the swap arrangement to a known configuration, thereby emphasizing the cost effectiveness of the promoted solution.

The invention claimed is:

1. An electro-pneumatic brake system for an automotive vehicle comprising:
    a service brake arrangement,
    a park brake arrangement,
    wherein the service brake arrangement is configured to operate either under a normal brake operating mode or under a redundant operating mode,
    one or more front axle brake modules for providing pneumatic brake pressure to left and right front pneumatic brake actuators,
    one or more rear axle brake modules for providing pneumatic brake pressure to left and right rear pneumatic brake actuators,
    wherein one or more of the rear pneumatic brake actuators comprises a park brake chamber,
    wherein each of the front and the rear axle brake modules comprise an electrical control input and a pneumatic control input,
    a first bistable relay valve configured to supply parking brake pressure to the park brake chambers,
    a first pressure control device for generating a first pressure,
    a second pressure control device for generating a second pressure,
    a first service brake backup line for controlling at least the pneumatic control input of the front axle brake module(s), and
    a second service brake backup line for controlling the pneumatic control input of the rear axle brake module(s),
    wherein the system comprises a swap arrangement configured to:
        selectively connect the first pressure to the input of the first bistable relay valve or to the first service brake backup line, the swap arrangement being further configured to connect the second pressure to the second service brake backup line.

2. The brake system of claim 1, wherein the system further comprises:
    a second bistable relay valve configured to supply trailer air pressure to a trailer,
    wherein the swap arrangement is further configured to selectively connect the second pressure to the input of the second bistable relay valve or to the second service brake backup line.

3. The brake system of claim 2, wherein the swap arrangement comprises a single combined 6/2 distributor comprising 6 ports with 2 positions type.

4. The brake system of claim 1:
    wherein the swap arrangement comprises a first electro-valve and, where applicable, a second electro-valve,
    wherein the first electro-valve is configured to direct the first pressure either to the input of the first bistable relay valve or to the first service brake backup line, and
    wherein, where applicable, the second electro-valve is configured to direct the second pressure either to the input of the second bistable relay valve or to the second service brake backup line.

5. The brake system of claim 4, wherein the first electro-valve and/or, where applicable, the second electro-valve comprises 4 ports with 2 positions type comprising a 4/2 valve with four ports and two plunger positions) and an electric control.

6. The brake system of claim 3, wherein the single combined 6/2 distributor is pneumatically controlled from a third electro-valve.

7. The brake system of claim 1, wherein the swap arrangement is spring loaded to a rest state so that when non energized in the rest state, the swap arrangement directs the first pressure to the first service brake backup line, and the swap arrangement directs the second pressure to the second service brake backup line.

8. The brake system of claim 1, wherein each of the first pressure control device and the second pressure control device comprises:
    an input valve,
    an output valve, and
    pressure sensors for establishing respectively the first pressure and the second pressure according to electronically defined real-time pressure setpoints and for performing a closed loop control.

9. The brake system of claim 1, further comprising pressure sensors respectively on the first and second service brake backup lines.

10. The brake system of claim 1, wherein the first service brake backup line also supplies a trailer brake control.

11. The brake system of claim 1, wherein the system further comprises an air production module, and the air production module houses at least the following components:
    the first bistable relay valve and, where applicable, the second bistable relay valve,
    the swap arrangement, whatever the possible variants,
    the first pressure control device and the second pressure control device, and
    wherein control is carried out by an air production module control unit housed in the air production module.

12. A vehicle comprising the system of claim 1.

13. A method to control a brake system comprising:
    a service brake arrangement, and
    a park brake arrangement,
    wherein the service brake arrangement is configured to operate either under a normal brake operating mode or under a redundant operating mode,
    the service brake arrangement comprising:
        one or more front axle brake modules for providing pneumatic brake pressure to left and right front pneumatic brake actuators,
        one or more rear axle brake modules for providing pneumatic brake pressure to left and right rear pneumatic brake actuators,
        wherein one or more of the rear pneumatic brake actuators comprises a park brake chamber,
        wherein each of the front and the rear axle brake modules comprise an electrical control input and a pneumatic control input,
        a first bistable relay valve configured to supply parking brake pressure to the park brake chambers,
        a first service brake backup line for controlling at least the pneumatic control input of the front axle brake module(s), a second service brake backup line for controlling the pneumatic control input of the rear axle brake module(s), and a swap arrangement, the method further comprising:

generating a first pressure from a first pressure control device, generating a second pressure from a second pressure control device, when no change is required on the parking brake, causing the swap arrangement to connect/couple the first pressure to the first service brake backup line, and to connect/couple the second pressure to the second service brake backup line, and when a change is required on the parking brake, causing the swap arrangement to connect/couple the first pressure to the input of the first bistable relay valve and control the first pressure on purpose, until a desired change of state is achieved.

14. The method of claim 13:

wherein the system further comprises:

a second bistable relay valve configured to supply trailer air pressure to a trailer, and wherein the method further comprises:

when a change is required on the trailer air supply, causing the swap arrangement to connect/couple the second pressure to the input of the second bistable relay valve and control the second pressure on purpose, until a desired change of state is achieved.

15. The method of claim 14, wherein the causing the swap arrangement to connect/couple the first and/or the second pressures is carried out simultaneously by a single combined 6/2 distributor.

* * * * *